United States Patent
Kamimura et al.

(10) Patent No.: US 9,353,198 B2
(45) Date of Patent: May 31, 2016

(54) METHOD FOR POLYMERIZING ALPHA-OLEFIN

(75) Inventors: Akihiro Kamimura, Kawasaki (JP); Akihiro Otsubo, Kawasaki (JP); Shintaro Takemiya, Kawasaki (JP)

(73) Assignee: SUNALLOMER LTD., Tokyo (JP)

( * ) Notice: Subject to any disclaimer, the term of this patent is extended or adjusted under 35 U.S.C. 154(b) by 0 days.

(21) Appl. No.: 14/130,900

(22) PCT Filed: Jul. 3, 2012

(86) PCT No.: PCT/JP2012/066960
§ 371 (c)(1),
(2), (4) Date: Jan. 3, 2014

(87) PCT Pub. No.: WO2013/005735
PCT Pub. Date: Jan. 10, 2013

(65) Prior Publication Data
US 2014/0148562 A1 May 29, 2014

(30) Foreign Application Priority Data
Jul. 6, 2011 (JP) .................................. 2011-150001

(51) Int. Cl.
*C08F 2/00* (2006.01)
*C08F 4/44* (2006.01)
(Continued)

(52) U.S. Cl.
CPC ................ *C08F 10/06* (2013.01); *C08F 10/00* (2013.01)

(58) Field of Classification Search
CPC ............. C08F 2/00; C08F 4/44; C08F 110/06
USPC .................... 526/351, 75, 124.2, 128
See application file for complete search history.

(56) References Cited

U.S. PATENT DOCUMENTS

| 4,767,735 A | 8/1988 | Ewen et al. | |
|---|---|---|---|
| 5,032,560 A * | 7/1991 | Bailly | C08F 10/06 502/10 |

(Continued)

FOREIGN PATENT DOCUMENTS

| EP | 1801157 A1 * | 6/2007 | ............. C08L 23/14 |
|---|---|---|---|
| JP | H06-23406 | 2/1994 | |

(Continued)

OTHER PUBLICATIONS

PCT/JP2012/066960, Oct. 9, 2012, International Search Report.

*Primary Examiner* — Alexa Neckel
*Assistant Examiner* — Elizabeth Eng
(74) *Attorney, Agent, or Firm* — Workman Nydegger

(57) ABSTRACT

The purpose of the present invention is to produce an alpha-olefin polymer having excellent production stability utilizing a long-lasting high catalytic activity. Provided is a method for producing an alpha-olefin polymer using a catalyst comprising:
(A) a solid catalyst component comprising, as essential components, magnesium, titanium, a halogen and an electron donor compound;
(B) an organoaluminum compound; and
(C) an electron donor compound,
the method comprising:
(1) pre-polymerizing an alpha-olefin in the presence of the components (A) and (B) to produce a pre-polymerized catalyst;
(2) bringing the resultant pre-polymerized catalyst into contact with a contact product that is produced by contacting the components (B) and (C) with each other in advance; and
(3) adding the pre-polymerized catalyst that has been contacted with the contact product to a polymerization reaction vessel in which an alpha-olefin is introduced to polymerize the alpha-olefin.

7 Claims, 2 Drawing Sheets

Pre-contact method (1)

(51) Int. Cl.
*C08F 110/06* (2006.01)
*C08F 10/06* (2006.01)
*C08F 10/00* (2006.01)

(56) References Cited

U.S. PATENT DOCUMENTS

| | | | | |
|---|---|---|---|---|
| 5,122,583 | A * | 6/1992 | Ewen | B01J 8/0015 |
| | | | | 502/104 |
| 5,320,995 | A * | 6/1994 | Luciani et al. | 502/107 |
| 6,468,938 | B1 | 10/2002 | Govoni et al. | |
| 6,884,746 | B2 * | 4/2005 | Ko | C08F 10/00 |
| | | | | 502/103 |
| 2007/0021295 | A1 | 1/2007 | Morini et al. | |
| 2009/0069171 | A1 | 3/2009 | Sagae | |

FOREIGN PATENT DOCUMENTS

| | | | |
|---|---|---|---|
| JP | 2637076 | 4/1997 | |
| JP | 2740503 | 1/1998 | |
| JP | 10-182740 | 7/1998 | |
| JP | 2001-55413 | 2/2001 | |
| JP | 2002-500697 | 1/2002 | |
| JP | 2006-176565 | 7/2006 | |
| JP | 2006-316160 | 11/2006 | |
| JP | 2006-528271 | 12/2006 | |
| JP | 3984304 | 7/2007 | |
| WO | WO 9933843 A1 * | 7/1999 | C07F 3/00 |
| WO | WO 2009083522 A1 * | 7/2009 | C08F 110/06 |

* cited by examiner

Pre-contact method (1)

Pre-contact method (2)

Pre-contact method (3)

METHOD FOR POLYMERIZING ALPHA-OLEFIN

CROSS REFERENCE TO RELATED APPLICATIONS

This application is a U.S. Nationalization of PCT Application Number PCT/JP2012/066960, filed on Jul. 3, 2012, which claims priority to Japanese Patent Application No. 2011-150001, filed on Jul. 6, 2011, the entireties of which are incorporated herein by reference.

TECHNICAL FIELD

The present invention relates to a method for producing, as a general-purpose resin, an alpha-olefin polymer, in particular, a propylene-based polymer. The method of the present invention can be used to produce a highly stereoregular alpha-olefin polymer with long-lasting high catalytic efficiency. Further, an alpha-olefin polymer obtained by the method of the present invention has the advantage that the proportion of fine powder present in the polymer is very small and, hence, the polymer is superior in production stability and molding processability.

BACKGROUND ART

Methods for producing a crystalline polyolefin by polymerizing an alpha-olefin such as propylene or 1-butene in the presence of a stereoregular catalyst have been proposed in many prior art techniques and hence are known. Among these polymerization methods, ones for producing a highly stereoregular polymer with high catalytic activity by polymerizing an alpha-olefin in the presence of a catalyst formed of (a) a highly active titanium solid catalyst component comprising, as essential components, magnesium, titanium, a halogen and an electron donor, (b) an organoaluminum compound catalyst component and (c) an electron donor catalyst component, have been proposed in many prior art documents. These methods are employed on industrial scales as superior polymerization methods that avoid the need for the removal of any catalyst and amorphous polymer from polymers obtained after polymerization based on the methods. However, there is a significant demand for a rationalization technique even in the art, and a technique for polymerization with higher catalytic activity is in need.

Patent Document 1 (JP 2637076 B) discloses a process for producing a propylene block copolymer by the pre-polymerization of propylene in a first polymerization stage using an organoaluminum compound and a solid titanium catalyst component formed by contacting a magnesium compound, a titanium compound and a polycarboxylic acid compound as an electron donor, and the subsequent copolymerization of propylene and another alpha-olefin in a second polymerization stage using the pre-polymerized solid catalyst component, an organoaluminum compound and an organosilicon compound catalyst component as an electron donor. It is disclosed in Example 1 of Patent Document 1 that a solid catalyst component used in the pre-polymerization of propylene in a pre-polymerization step (a first polymerization stage), triethylaluminum (an organoaluminum compound) and n-propyltriethoxysilane (an electron donor) were added to a propylene-purged autoclave to polymerize propylene, followed by the addition of a gaseous mixture of ethylene and propylene into the system to give an ethylene-propylene copolymer. Patent Document 1 discloses nothing about the pre-contact of a pre-polymerized catalyst, an organoaluminum compound and an electron donor before polymerization or the order of the contact of these compounds.

Patent Document 2 (JP 2740503 B) discloses the pre-polymerization of an alpha-olefin using the following components: a titanium solid catalyst component obtained by reacting a magnesium compound with a tetravalent titanium compound and then reacting the reaction product with a polycarboxylic acid ester; an organometallic catalyst component; and an organosilicon compound, and the subsequent alpha-olefin polymerization using the pre-polymerized solid catalyst component. It is disclosed in Example 2 of Patent Document 2 that propylene was pre-polymerized using the following components: a titanium catalyst component comprising titanium, magnesium and diisobutyl phthalate; triethylaluminum; and diphenyldimethoxysilane, followed by the addition of the resulting pre-polymerized catalyst, triethylaluminum and diphenyldimethoxysilane to a propylene-containing autoclave to polymerize propylene. Patent Document 2 discloses nothing about the pre-contact of a pre-polymerized catalyst, an organoaluminum compound and an electron donor before polymerization or the order of the contact of these compounds.

Patent Document 3 (JP 3984304 B) discloses that polypropylene is produced using an olefin polymerization catalyst formed of: a contact product prepared by contacting a solid titanium catalyst component comprising magnesium, titanium, a halogen and an electron donor, an organometallic compound catalyst component and an organosilicon compound; a 1,3-diether compound; and an organometallic compound catalyst component. It is disclosed in Example 1 of Patent Document 3 that propylene was pre-polymerized using a solid catalyst component formed of magnesium chloride, titanium tetrachloride and diisobutyl phthalate; triethylaluminum; and dicyclopentyldimethoxysilane, followed by the charging of the resulting pre-polymerized catalyst, triethylaluminum and 2-isopentyl-2-isopropyl-1,3-dimethoxypropane into an autoclave charged with propylene to polymerize propylene. Patent Document 3 discloses nothing about the pre-contact of a pre-polymerized catalyst, an organoaluminum compound and an electron donor before polymerization or the order of the contact of these compounds.

Patent Document 4 (JP H07-23406 B) discloses a method by which propylene is pre-polymerized using a titanium complex comprising a magnesium halide and a titanium halide and an organoaluminum compound and then a propylene polymer is produced using the resulting solid catalyst component, an organoaluminum compound catalyst component and an organosilicon compound. It is disclosed in Example 1 of Patent Document 4 that a pre-polymerized catalyst, t-butylmethyldimethoxysilane and triethylaluminum were added to an autoclave to polymerize propylene. Patent Document 4 discloses nothing about the pre-contact of a pre-polymerized catalyst, an organoaluminum compound and an electron donor before polymerization or the order of the contact of these compounds.

As described above, it is widely known to pre-polymerize propylene before using a solid titanium catalyst component comprising magnesium, titanium, a halogen and an electron donor compound. However, there is no prior art document that discusses either the pre-contact of a pre-polymerized catalyst, an organoaluminum compound and an electron donor compound with each other before using the pre-polymerized catalyst in a main polymerization, or the order of the contact of those compounds.

CITATION LIST

Patent Documents

Patent Document 1: JP 2637076 B
Patent Document 2: JP 2740503 B
Patent Document 3: JP 3984304 B
Patent Document 4: JP H06-23406 B

SUMMARY OF INVENTION

Technical Problem

The present invention is a method for polymerizing an alpha-olefin in the presence of a catalyst formed of: a solid catalyst component comprising, as essential components, magnesium, titanium, a halogen and an electron donor compound; an organoaluminum compound; and an electron donor compound, the method comprising pre-polymerizing an alpha-olefin using the solid catalyst component in the presence of a small amount of an organoaluminum compound to prepare a pre-polymerized catalyst; subsequently pre-contacting the obtained pre-polymerized catalyst and a contact product, before the alpha-olefin polymerization, the contact product being produced by the pre-contact of an organoaluminum compound and an electron donor compound; and then polymerizing the alpha-olefin. As a result of studies on the order of the contact of a pre-polymerized catalyst, an organoaluminum compound and an electron donor at the pre-contact of these components, it turned out that, through the avoidance of any opportunity for the pre-polymerized catalyst and the electron donor compound to be contacted with each other as single components, the catalytic activity can be markedly enhanced and polymers having superior properties are obtained.

Embodiments of the present invention are as follows:
1. A method for producing an alpha-olefin polymer using a catalyst comprising:
(A) a solid catalyst component comprising, as essential components, magnesium, titanium, a halogen and an electron donor compound;
(B) an organoaluminum compound; and
(C) an electron donor compound,
the method comprising:
(1) pre-polymerizing an alpha-olefin in the presence of the components (A) and (B);
(2) bringing the resulting pre-polymerized catalyst into contact with a contact product produced by pre-contact of the components (B) and (C); and
(3) adding the pre-polymerized catalyst that has been contacted with the contact product to a polymerization reaction vessel charged with an alpha-olefin to polymerize the alpha-olefin.
2. The method according to 1 above, wherein the duration of the contact in the step (2) is not more than 20 minutes.
3. The method according to 1 or 2 above, wherein the component (C) is an organosilicon compound.
4. A method for producing an alpha-olefin polymer using a catalyst comprising:
(A) a solid catalyst component comprising, as essential components, magnesium, titanium, a halogen and an electron donor compound;
(B) an organoaluminum compound; and
(C) an electron donor compound,
the method comprising:
(1) pre-polymerizing an alpha-olefin in the presence of the components (A) and (B);
(2) bringing the resulting pre-polymerized catalyst into contact with the component (B); and
(3) adding the pre-polymerized catalyst that has been contacted with the component (B) to a polymerization reaction vessel charged with the component (C) and an alpha-olefin to polymerize the alpha-olefin.
5. The method according to 4 above, wherein the duration of the contact in the step (2) is not more than 20 minutes.
6. The method according to 4 or 5 above, wherein the component (C) is an organosilicon compound.

The present invention will be described in detail below.

Solution to Problem

To begin with, a first embodiment of the alpha-olefin polymerization method according to the present invention will be described. The present invention is directed to a method for producing an alpha-olefin polymer using a catalyst comprising: (A) a solid catalyst component comprising, as essential components, magnesium, titanium, a halogen and an electron donor compound; (B) an organoaluminum compound; and (C) an electron donor compound, the method comprising: (1) pre-polymerizing an alpha-olefin in the presence of the components (A) and (B); (2) bringing the resulting pre-polymerized catalyst into contact with a contact product produced by the pre-contact of the components (B) and (C); and (3) adding the pre-polymerized catalyst that has been contacted with the contact product to a polymerization reaction vessel charged with an alpha-olefin to polymerize the alpha-olefin.

The alpha-olefin to be polymerized in the present invention may be selected from a wide variety of common alpha-olefins such as ethylene and alpha-olefins having 3 to 20 carbon atoms, for example, propylene, 1-butene, 4-methyl-1-pentene, 1-hexene, 1-octene, 1-decene, 1-dodecene and 1-tetradecene. Especially, the present invention produces significant effects in the polymerization of propylene.

The solid catalyst component used as the component (A) in the present invention comprises, as essential components, magnesium, titanium, a halogen and an electron donor compound. Methods for producing such a solid catalyst component are presented in many prior art documents. More specifically, the solid catalyst component is obtained by contacting a magnesium compound, a titanium compound and an electron donor compound with each other. For example, the solid catalyst component used as the component (A) in the present invention can be obtained by various methods such as (1) the method of allowing a titanium compound as a liquid phase under reaction conditions to react with a solid obtained by the grinding or no grinding of a magnesium compound or a complex compound comprising a magnesium compound and an electron donor compound in the presence or absence of an electron donor compound, a grinding aid or the like and the pretreatment or no pretreatment of the magnesium compound or the complex compound, with an electron donor compound and/or a reaction aid such as an organoaluminum compound or a halogen-containing silicon compound; (2) the method of precipitating a solid titanium complex by reacting a liquid of a magnesium compound with a liquid titanium compound in the presence or absence of an electron donor compound; (3) the method of reacting a solid magnesium compound with a liquid titanium compound and an electron donor compound; (4) the method of further reacting a product obtained in (2) or (3) above with a titanium compound; (5) the method of further reacting a product obtained in (1), (2) or (3) above with an electron donor compound and a titanium compound; (6) the method of treating, with a halogen or a halogen compound or an aromatic hydrocarbon, a solid obtained by the grinding of a magnesium compound or a complex compound comprising a magnesium compound and an electron donor compound in the presence or absence of an electron donor compound, a grinding aid or the like in the presence of a titanium compound and the pretreatment or no pretreatment of the magnesium compound or the complex compound, with an electron donor compound and/or a reaction aid such as an organoaluminum compound or a halogen-containing silicon compound; and (7) the method of treating the compound obtained in any one of (1) to (5) above with a halogen or a halogen compound or an aromatic hydrocarbon.

As a titanium compound used in the preparation of the solid catalyst component (A) used in the present invention, a tetravalent titanium compound represented by the following general formula is preferred:

$$Ti(OR)_gX_{4-g} \quad \text{[Formula 1]}$$

wherein R is a hydrocarbon group, X is a halogen, and $0 \leq g \leq 4$. More specific examples include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O_n\text{—}C_4H_9)Cl_3$, $Ti(OC_2H_5)Br_3$ and $Ti(OisoC_4H_9)Br_3$; alkoxytitanium dihalides such as $Ti(OCH_3)_2Cl_2$, $Ti(OC_2H_5)_2Cl_2$, $Ti(O_n\text{—}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O_n\text{—}C_4H_9)_3Cl$ and $Ti(OC_2H_5)_3Br$; tetraalkoxytitaniums such as $Ti(OCH_3)_4$, $Ti(OC_2H_5)_4$ and $Ti(O_n\text{—}C_4H_9)_4$; and the like. Among these compounds, halogen-containing titanium compounds, in particular, titanium tetrahalides, are preferred, and titanium tetrachloride is particularly preferred.

Examples of the magnesium compound used in the preparation of the solid catalyst component (A) used in the present invention include magnesium compounds having a magnesium-carbon bond or a magnesium-hydrogen bond, such as dimethyl magnesium, diethyl magnesium, dipropyl magnesium, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butylethoxymagnesium, ethylbutyl magnesium and butylmagnesium hydrides. These magnesium compounds may also be used, for example, in the form of a complex compound formed with an organoaluminum or the like and may be in a liquid or solid state. Examples of more preferred magnesium compounds include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxymagnesium chloride and methylphenoxymagnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; carboxylic acid salts of magnesium such as magnesium laurate and magnesium stearate; and the like.

The electron donor compound used in the preparation of the solid catalyst component (A) in the present invention is generally termed an "internal electron donor". Examples of such an electron donor compound include oxygen-containing electron donors such as alcohols, phenols, ketones, aldehydes, carboxylic acids, organic or inorganic acid esters, ethers, acid amides and acid anhydrides; nitrogen-containing electron donors such as ammonia, amines, nitriles and isocyanates; and the like. More specific examples include alcohols having 1 to 18 carbon atoms such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol; phenols having 6 to 25 carbon atoms which may have an alkyl group, such as phenol, cresol, xylenol, ethylphenol, propylphenol, cumylphenol, nonylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms which include under-mentioned esters contained preferably in a titanium catalyst component, such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, diisobutyl phthalate, dioctyl phthalate, gamma-butyrolactone, delta-valerolactone, coumarin, phthalide and ethylene carbonate; inorganic acid esters such as ethyl silicate, butyl silicate, vinyltriethoxysilane, phenyltriethoxysilane and diphenyldiethoxysilane; acid halides having 2 to 15 carbon atoms such as acetyl chloride, benzoyl chloride, toluic acid chloride, anisic acid chloride and phthalic acid dichloride; ethers having 2 to 20 carbon atoms such as methyl ether, ethyl ether, isopropyl ether, butyl ether, amyl ether, tetrahydrofuran, anisole and diphenyl ether; 1,3-diethers such as 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(p-fluorophenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 1,1-bis(methoxymethyl)-cyclopentadiene, 1,1-bis(methoxymethyl)-2,3,4,5-tetramethylcyclopentadiene, 1,1-bis(methoxymethyl)-2,3,4,5-tetraphenylcyclopentadiene, 1,1-bis(methoxymethyl)-2,3,4,5-tetrafluorocyclopentadiene, 1,1-bis(methoxymethyl)-3,4-dicyclopentylcyclopentadiene, 1,1-bis(methoxymethyl)indene, 1,1-bis(methoxymethyl)-2,3-dimethylindene, 1,1-bis(methoxymethyl)-4,5,6,7-tetrahydroindene, 1,1-bis(methoxymethyl)-2,3,6,7-tetrafluoroindene, 1,1-bis(methoxymethyl)-4,7-dimethylindene, 1,1-bis(methoxymethyl)-3,6-dimethylindene, 1,1-bis(methoxymethyl)-4-phenylindene, 1,1-bis(methoxymethyl)-4-phenyl-2-methylindene, 1,1-bis(methoxymethyl)-4-cyclohexylindene, 1,1-bis(methoxymethyl)-7-(3,3,3-trifluoropropyl)indene, 1,1-bis(methoxymethyl)-7-trimethylsilylindene, 1,1-bis(methoxymethyl)-7-trifluoromethylindene, 1,1-bis(methoxymethyl)-4,7-dimethyl-4,5,6,7-tetrahydroindene, 1,1-bis(methoxymethyl)-7-methylindene, 1,1-bis(methoxymethyl)-7-cyclopentylindene, 1,1-bis(methoxymethyl)-7-isopropylindene, 1,1-bis(methoxymethyl)-7-cyclohexylindene, 1,1-bis(methoxymethyl)-7-tert-butylindene, 1,1-bis(methoxymethyl)-7-tert-butyl-2-methylindene, 1,1-bis(methoxymethyl)-7-phenylindene, 1,1-bis(methoxymethyl)-2-phenylindene, 1,1-bis(methoxymethyl)-1H-benzindene, 1,1-bis(methoxymethyl)-1H-2-methylbenzindene, 9,9-bis(methoxymethyl)fluorene, 9,9-bis(methoxymethyl)-2,3,6,7-tetramethylfluorene, 9,9-bis(methoxymethyl)-2,3,4,5,6,7-hexafluorofluorene, 9,9-bis(methoxymethyl)-2,3-benzofluorene, 9,9-bis(methoxymethyl)-2,3,6,7-dibenzofluorene, 9,9-bis(methoxymethyl)-2,7-diisopropylfluorene, 9,9-bis(methoxymethyl)-1,8-dichlorofluorene, 9,9-bis(methoxymethyl)-2,7-dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene and 9,9-bis(methoxymethyl)-4-tert-butylfluorene; acid amides such as acetamide, benzamide and toluamide; acid anhydrides such as benzoic anhydride and phthalic anhydride; amines such as methylamine, ethylamine, diethylamine, tributylamine, piperidine, tribenzylamine, aniline, pyridine, picoline and tetramethylethylenediamine; nitriles such as acetonitrile, benzonitrile and tolunitrile; and the like. These electron donor compounds may be used in a combination of two or more.

An electron donor compound contained preferably in the solid catalyst component is an ester, more preferably, for example, a compound having a skeleton represented by the following general formula:

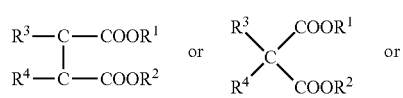

[Formula 2]

-continued

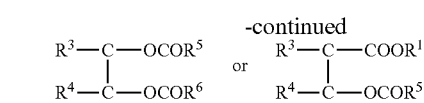

wherein $R^1$ is a substituted or unsubstituted hydrocarbon group, each of $R^2$, $R^5$ and $R^6$ is hydrogen or a substituted or unsubstituted hydrocarbon group, each of $R^3$ and $R^4$ is hydrogen or a substituted or unsubstituted hydrocarbon group, at least either $R^3$ or $R^4$ is preferably a substituted or unsubstituted hydrocarbon group, and $R^3$ and $R^4$ may be linked to each other. The substituted hydrocarbon groups as $R^1$ to $R^6$ above have a group containing a heteroatom such as N, O or S, for example, C—O—C, COOR, COOH, OH, $SO_3H$, —C—N—C— or $NH_2$.

Among these compounds, particularly preferred is a dicarboxylic acid diester (polycarboxylic acid diester) in which at least one of $R^1$ and $R^2$ is an alkyl group having at least 2 carbon atoms.

Specific examples of the preferred polycarboxylic acid diester include aliphatic polycarboxylic acid esters such as diethyl succinate, dibutyl succinate, diethyl methylsuccinate, diethyl diisopropylsuccinate, diisobutyl alpha-methylglutarate, dibutyl methylmalonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and diethyl esters of Nadic acid; aromatic polycarboxylic acid esters such as monoethyl phthalate, dimethyl phthalate, methylethyl phthalate, monoisobutyl phthalate, mono-n-butyl phthalate, diethyl phthalate, ethylisobutyl phthalate, ethyl n-butyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; heterocyclic polycarboxylic acid esters such as 3,4-furandicarboxylic acid esters; and the like.

A polyhydroxy compound ester may be used as an electron donor compound, and specific examples of a preferred polyhydroxy compound ester include 1,2-diacetoxybenzene, 1-methyl-2,3-diacetoxybenzene, 2,3-diacetoxynaphthalene, ethylene glycol dipivalate, butanediol pivalate, and the like.

Examples of a hydroxy-substituted carboxylic acid ester that can be preferably used likewise as an electron donor compound include benzoylethyl salicylate, acetylisobutyl salicylate, acetylmethyl salicylate, and the like.

Other examples of a polycarboxylic acid diester that may be supported by the solid catalyst component include long-chain dicarboxylic acid esters such as diethyl adipate, diisobutyl adipate, diisopropyl sebacate, di-n-butyl sebacate, di-n-octyl sebacate and di-2-ethylhexyl sebacate.

Among these polyfunctional esters, preferred are esters having a skeleton represented by the general formula mentioned above, more preferred are esters formed between a phthalic acid, a maleic acid, a substituted malonic acid or the like and an alcohol having at least 2 carbon atoms, and particularly preferred are diesters formed between a phthalic acid and an alcohol having at least 2 carbon atoms.

Another electron donor compound that may be supported by the solid catalyst component is a monocarboxylic acid ester represented by RCOOR' where each of R and R' is a hydrocarbyl group that may have a substituent and at least either of them is a branched group (including alicyclic groups in the scope of the group) or a ring-containing chain group. For example, R and/or R' may be the following group(s).

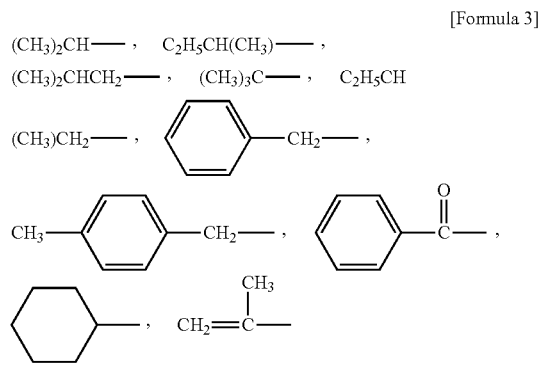

[Formula 3]

When either R or R' is any of the groups as shown above, the other may be any of the groups shown above or another group such as a linear or cyclic group.

Specific examples include various monoesters of dimethylacetic acid, trimethylacetic acid, alpha-methylbutyric acid, beta-methylbutyric acid, methacrylic acid or benzoylacetic acid, and various monocarboxylic acid esters of an alcohol such as isopropanol, isobutyl alcohol or tert-butyl alcohol.

A carbonic acid ester may also be selected as an electron donor compound. Specific examples include diethyl carbonate, ethylene carbonate, diisopropyl carbonate, phenylethyl carbonate, diphenyl carbonate, and the like.

Examples of the halogen atom that constitutes the solid catalyst component include fluorine, chlorine, bromine, iodine and mixtures thereof, particularly preferably chlorine.

The organoaluminum compound used as the component (B) in the method of the present invention may be selected from, for example, trialkyl aluminums such as triethyl aluminum and tributyl aluminum; trialkenyl aluminums such as triisoprenyl aluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; as well as partially alkoxylated alkyl aluminums having an average composition represented by $R^1{}_{2.5}Al(OR^2)_{0.5}$ or the like; partially halogenated alkyl aluminums, for example, dialkylaluminum halogenides such as diethylaluminum chloride, dibutylaluminum chloride and diethylaluminum bromide, alkylaluminum sesquihalogenides such as ethylaluminum sesquichloride, butylaluminum sesquichloride and ethylaluminum sesquibromide, and alkylaluminum dihalogenides such as ethylaluminum dichloride, propylaluminum dichloride and butylaluminum dibromide; partially hydrogenated alkylaluminums, for example, dialkylaluminum hydrides such as diethylaluminum hydride and dibutylaluminum hydride, and alkylaluminum dihydrides such as ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

The electron donor compound used as the component (C) in the method of the present invention is generally termed an "external electron donor". As such an electron donor compound, an organosilicon compound is preferably used. Examples of preferred organosilicon compounds include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, dimethyltetraethoxydisiloxane, and the like. Particularly preferred are ethyltriethoxysilane, n-propyltriethoxysilane, t-butyltriethoxysilane, thexyltrimethoxysilane, vinyltriethoxysilane, phenyltriethoxysilane, vinyltributoxysilane, diphenyldimethoxysilane, diisopropyldimethoxysilane, dicyclopentyldimethoxysilane, cyclohexylmethyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, diphenyldiethoxysilane, ethyl silicate, and the like.

The method of the present invention is characterized in that it is implemented in the following order:
(1) pre-polymerizing an alpha-olefin in the presence of the components (A) and (B);
(2) bringing the resulting pre-polymerized catalyst into contact with a contact product produced by the pre-contact of the components (B) and (C); and
(3) polymerizing an alpha-olefin using the pre-polymerized catalyst that has been contacted with the contact product.

First, an alpha-olefin is pre-polymerized in the presence of a solid catalyst component as the component (A) and an organoaluminum compound as the component (B). The amount of the component (B) used for this purpose, which is smaller than that of the component (B) used at main polymerization, is generally 0.5 to 50 mol, preferably 1.0 to 20 mol, relative to 1 mol of the Ti atoms contained in the component (A). When the amount of the component (B) is too large in the pre-polymerization stage, the shelf stability of a pre-polymerized catalyst obtained can be compromised. Hence, in this stage, an alpha-olefin is pre-polymerized using the component (A) in the presence of such a small amount of the component (B). The alpha-olefin pre-polymerization is a process by which alpha-olefin chains that serve as a foothold toward the subsequent main alpha-olefin polymerization are formed on the solid catalyst component.

The pre-polymerization may be performed by a known method such as a batch-wise method or a continuous method, but a batch-wise method is preferable in that a high concentration of a solid catalyst can be used and also in terms of the control of the amount of alpha-olefin to be pre-polymerized. Further, the pre-polymerization may be performed under a solvent-free condition or in an inert medium, but it is preferably performed in an inert hydrocarbon medium. As such an inert hydrocarbon solvent, for example, a hydrocarbon such as butane, pentane, hexane, heptane, octane, benzene, toluene, xylene or ethylbenzene may be used. The pre-polymerization is generally performed at 40° C. or less, preferably 30° C. or less, more preferably 20° C. or less. The amount of alpha-olefin to be pre-polymerized is 0.5 to 300 g, preferably 1 to 100 g, more preferably 2 to 30 g, relative to 1 g of a solid catalyst used.

Examples of the alpha-olefin used in the pre-polymerization include ethylene and alpha-olefins having 3 to 20 carbon atoms, for example, propylene, 1-butene, 4-methyl-1-pentene, 1-hexene, 1-octene, 1-decene, 1-dodecene and 1-tetradecene. It is preferable to use propylene alone, or propylene and ethylene and/or a small amount of an alpha-olefin. Further, hydrogen may be used as a molecular weight modifier at the pre-polymerization as needed.

Subsequently, the pre-polymerized catalyst obtained in the step (1) mentioned above is contacted with a contact product produced by the pre-contact of the component (B) and an electron donor compound as the component (C). The component (C) is contacted with the component (B) in a proportion of 0.005 to 2.0 mol, preferably 0.01 to 1.0 mol, relative to 1 mol of the component (B), generally at 50° C. or less, preferably 40° C. or less, more preferably 30° C. or less. They may also be contacted in an inert solvent. This contact process is not particularly limited, but the respective components may be contacted using, for example, a pipe, a metal vessel or a stirrer-equipped metal vessel.

The duration for which the pre-polymerized catalyst and the contact product produced by the pre-contact of the components (B) and (C) are pre-contacted outside the polymerization system (as termed herein, the "pre-contact duration") is preferably not more than 20 minutes. In particular, the pre-contact duration is preferably at most 10 minutes or may be a very short duration such as at most 1 minute, at most 0.5 minute or at most 0.25 minute. This method for contacting the pre-polymerized catalyst and the contact product produced by the pre-contact of the components (B) and (C) is not particularly limited; however, when the contact product is continuously supplied to a reaction vessel used for the main polymerization, the pre-polymerized catalyst and the contact product may be contacted in any of a pipe, a metal vessel and a stirrer-equipped metal vessel that are connected to the reaction vessel. The aforementioned pre-contact duration may be adjusted as appropriate for this purpose by changing the pipe length or the time of residence in such a vessel.

The amounts of the components (B) and (C) to be contacted with the pre-polymerized catalyst are preferably 30 to 3000 mol for the component (B) and 0.03 to 3000 mol for the component (C), relative to 1 mol of the Ti atoms contained in the pre-polymerized catalyst; however, these amounts can change depending on the types of the components (B) and (C) used. In the present invention, it is important that a pre-contact process in which the pre-polymerized catalyst and the contact product produced by the pre-contact of the components (B) and (C) are pre-contacted outside the polymerization system is undergone for a specific pre-contact duration. The ratio between the respective components to be contacted may be changed as appropriate according to intended use.

Examples of the inert solvent that may be used in the contact of the components (B) and (C) and the pre-contact of the pre-polymerized catalyst and the contact product include hydrocarbon compounds such as butane, pentane, hexane, heptane, octane, benzene, toluene, xylene and ethylbenzene. The temperature at which the respective components are contacted is generally 50° C. or less, preferably 40° C. or less, more preferably 30° C. or less.

The catalyst thus obtained by the pre-contact is added into a polymerization reaction system charged with an alpha-olefin to perform the main polymerization of the alpha-olefin.

For the main polymerization, a method of slurry polymerization, gas phase polymerization or bulk polymerization or a known method as a combination of these methods is used. The main polymerization method may be any of batch-wise, semi-continuous and continuous methods, but a continuous method is preferred for industrial purposes. The polymerization temperature is normal temperature to 150° C., preferably 40° C. to 100° C. The pressure to be applied is, generally, ordinary pressure to 10 MPa, preferably 0.5 to 60 MPa. The polymerization duration is generally 10 hours or less, preferably 10 minutes to 5 hours.

Examples of the alpha-olefin used in the main polymerization include ethylene and alpha-olefins having 3 to 20 carbon atoms, for example, propylene, 1-butene, 4-methyl-1-pentene, 1-hexene, 1-octene, 1-decene, 1-dodecene and 1-tetradecene. The present invention is particularly suitable for the production of propylene homopolymers as well as propylene/alpha-olefin random copolymers or propylene/alpha-olefin block copolymers. Examples of alpha-olefins other than propylene which are used for copolymerization with propylene include ethylene, butene-1, and the like. During the main polymerization, hydrogen may be used as a molecular weight modifier.

The method of the present invention can increase polymer yields (i.e., increase catalytic activity).

A second embodiment of the present invention is directed to a method for producing an alpha-olefin polymer using a catalyst comprising: (A) a solid catalyst component comprising, as essential components, magnesium, titanium, a halogen and an electron donor compound; (B) an organoaluminum compound; and (C) an electron donor compound, the method comprising: (1) pre-polymerizing an alpha-olefin in the presence of the components (A) and (B); (2) bringing the resulting pre-polymerized catalyst into contact with the component (B); and (3) adding the pre-polymerized catalyst that has been contacted with the component (B) to a polymerization reaction vessel charged with the component (C) and an alpha-olefin to polymerize the alpha-olefin.

Differences of the second embodiment of the present invention from the first embodiment are that a pre-polymerized catalyst and only the component (B) are first pre-contacted in the step (2) and that the pre-polymerized catalyst that is obtained in the step (2) and has been pre-contacted with only the component (B) is added to a polymerization reaction vessel charged with the component (C) and an alpha-olefin to polymerize the alpha-olefin. More specifically, the pre-polymerized catalyst obtained in the step (1) is contacted with only the component (B) in the step (2). In the present invention, prior to the start of the main alpha-olefin polymerization, the pre-polymerized catalyst and the component (B) are pre-contacted outside the polymerization system (for example, in any of a pipe, a metal vessel and a stirrer-equipped metal vessel that are connected to the reaction vessel, or using, for example, an additional vessel provided to the polymerization reaction vessel). The duration for which the pre-polymerized catalyst and the component (B) are pre-contacted outside the polymerization system (i.e., the pre-contact duration) is preferably not more than 20 minutes. In particular, the pre-contact duration is preferably at most 10 minutes or may be a very short duration such as at most 1 minute, at most 0.5 minute or at most 0.25 minute. As in the case of the first embodiment of the present invention, the pre-polymerization is performed using a small amount of the component (B) (preferably, 0.5 to 50 mol, more preferably 1.0 to 20 mol, relative to 1 mol of the Ti atoms contained in the component (A)) in the pre-polymerization stage in the step (1). The reason is that when the amount of the component (B) is too large in the pre-polymerization stage, the shelf stability of a pre-polymerized catalyst obtained can be compromised. The amount of the component (B) to be contacted with the pre-polymerized catalyst is preferably 30 to 3000 mol relative to 1 mol of the Ti atoms contained in the pre-polymerized catalyst; however, this amount can change depending on the types of the component (B) used and the component (C) used in the subsequent step. In the present invention, it is important that a pre-contact process in which the pre-polymerized catalyst and the component (B) are pre-contacted outside the polymerization system is undergone for a specific pre-contact duration. The ratio between the respective components to be contacted may be changed as appropriate according to intended use. Examples of an inert solvent that may be used in the pre-contact of the pre-polymerized catalyst and the component (B) include hydrocarbon compounds such as butane, pentane, hexane, heptane, octane, benzene, toluene, xylene and ethylbenzene. The amount of the alpha-olefin to be pre-polymerized is 0.5 to 300 g, preferably 1 to 100 g, more preferably 2 to 30 g, relative to 1 g of a solid catalyst used.

The catalyst thus obtained by the pre-contact is added into a polymerization reaction system charged with the component (C) (0.005 to 2.0 mol relative to 1 mol of the component (B) used in the contact in the step (2)) and an alpha-olefin to perform the main polymerization of the alpha-olefin.

The method of the present invention can increase polymer yields (i.e., increase catalytic activity).

Advantageous Effects of Invention

The method of the present invention can increase the yields of alpha-olefin polymers and maintain catalytic activity for a long period of time. Since the proportion of fine powder present in the alpha-olefin polymers obtained by the method of the present invention is small, any trouble such as production line blockage due to fine powder aggregation can be reduced, which enables stable production. In addition, the obtained alpha-olefin polymers are superior in processing properties.

DESCRIPTION OF EMBODIMENTS

Figure 1:
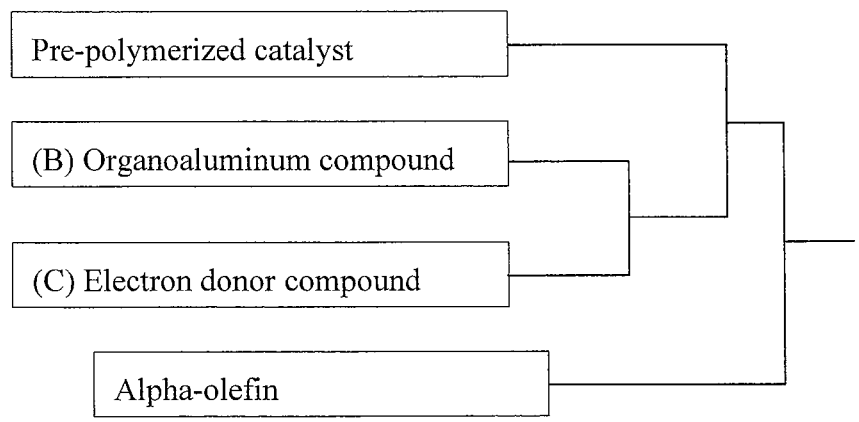
FIG. 1 is a diagram showing the steps in the polymerization method according to the first embodiment of the present invention.
Figure 2:
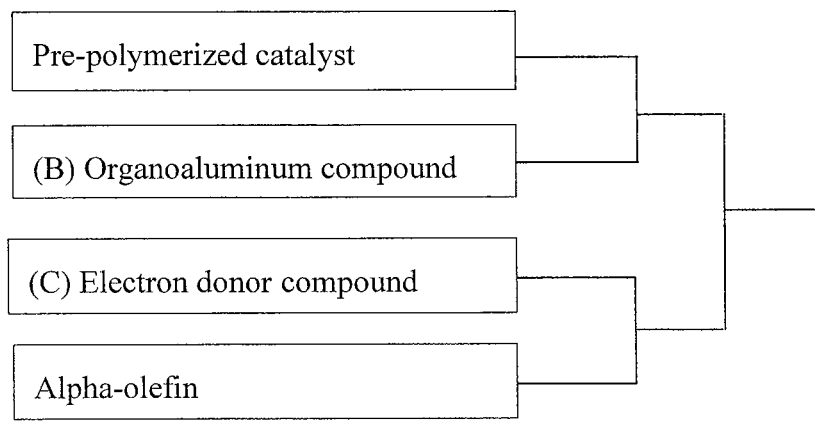
FIG. 2 is a diagram showing the steps in the polymerization method according to the second embodiment of the present invention.
Figure 3:
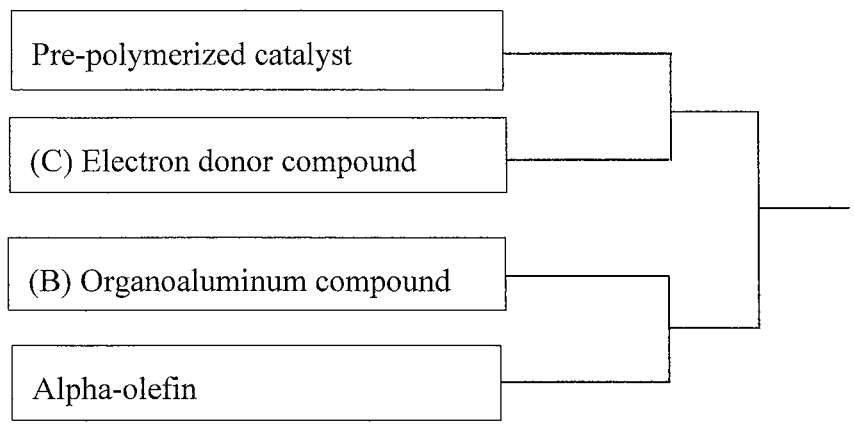
FIG. 3 is a diagram showing the steps in the polymerization method of a comparative example.

Next, the polymerization method according to the first embodiment of the present invention will be described specifically. First, the component (A) used in the present invention, i.e., a solid catalyst component comprising, as essential components, magnesium, titanium, a halogen and an electron donor compound may be prepared as appropriate based on prior art techniques known to the skilled person.

The next step is pre-polymerizing an alpha-olefin in the presence of the prepared solid catalyst component. To a reaction vessel purged with an inert gas (for example, nitrogen, argon), an inert solvent (for example, pentane, hexane, heptane, octane) is added, and cooled (40° C. or less, preferably 30° C. or less, more preferably 20° C. or less). A solution of an organoaluminum compound (for example, triethylaluminum, triisobutylaluminum) in an inert solvent is added thereto, and the solid catalyst component as the component (A) obtained in the aforementioned step is added thereto. Then, an alpha-olefin to be pre-polymerized (for example, ethylene, propylene, 1-butene) is supplied to the reaction vessel to pre-polymerize the alpha-olefin. The resulting pre-polymerized catalyst (solid phase) is washed with a wash solvent as appropriate and the washed pre-polymerized catalyst is dissolved in an inert solvent; a slurry of the pre-polymerized catalyst can be thus prepared.

The subsequent step is contacting an organoaluminum compound as the component (B) and an electron donor compound as the component (C) and then contacting the thus obtained contact product with the pre-polymerized catalyst. To a polymerization reaction vessel used for the main polymerization of an alpha-olefin (for example, an autoclave), a vessel for the pre-contact of the pre-polymerized catalyst, an organoaluminum and an electron donor compound is attached (For example, the vessel for the pre-contact is preferably an additional metal vessel, but any vessel may be used as long as it has functions that can pre-contact those substances reasonably and can supply the catalyst obtained by the pre-contact to the polymerization reaction vessel. Hereinafter, the vessel is termed the "pre-contact vessel".) To the attached pre-contact vessel, an organoaluminum compound (for example, triethylaluminum, triisobutylaluminum) and an electron donor compound (for example, diisopropyldimethoxysilane, dicyclopentyldimethoxysilane, cyclohexylmethyldimethoxysilane) are added. The pre-polymerized catalyst slurry obtained as mentioned above is added thereto, and these substances are pre-contacted for at most 20 minutes, preferably at most 10 minutes, more preferably at most 1 minute, most preferably at most 0.5 minute. The contact temperature is generally 50° C. or less, preferably 40° C., more preferably 30° C. or less.

The subsequent step is the main polymerization of alpha-olefin. To the polymerization reaction vessel, which has been purged with an inert gas (preferably, for example, nitrogen, argon), an alpha-olefin to be polymerized (for example, ethylene, propylene, butene) is added, and heated to room temperature or higher, preferably 30° C. or higher. Then, the pre-contact vessel containing the pre-polymerized catalyst, which has been subjected to the pre-contact mentioned above, is pressurized to inject the catalyst obtained by the pre-contact into the polymerization reaction vessel. The polymerization reaction vessel is heated (generally to a temperature of between normal temperature and 150° C., preferably between 40° C. and 100° C., which changes depending on the type of the alpha-olefin) to polymerize the alpha-olefin. Unreacted alpha-olefin is purged from the polymerization reaction vessel to obtain an alpha-olefin polymer of interest. To produce an alpha-olefin polymer having a desired molecular weight, hydrogen or the like may be added to the polymerization reaction vessel as appropriate.

The polymerization method according to the second embodiment of the present invention is essentially the same as that of the first embodiment. First, the component (A) used in the present invention, i.e., a solid catalyst component comprising, as essential components, magnesium, titanium, a halogen and an electron donor compound may be prepared as appropriate based on prior art techniques known to the skilled person.

The next step is pre-polymerizing an alpha-olefin in the presence of the prepared solid catalyst component. To a reaction vessel purged with an inert gas (for example, nitrogen, argon), an inert solvent (for example, pentane, hexane, heptane, octane) is added, and cooled (40° C. or less, preferably 30° C. or less, more preferably 20° C. or less). A solution of an organoaluminum compound (for example, triethylaluminum, triisobutylaluminum) in an inert solvent is added thereto, and the solid catalyst component as the component (A) obtained in the aforementioned step is added thereto. Then, an alpha-olefin to be pre-polymerized (for example, ethylene, propylene, 1-butene) is supplied to the reaction vessel to pre-polymerize the alpha-olefin. The resulting pre-polymerized catalyst (solid phase) is washed with a wash solvent as appropriate and the washed pre-polymerized catalyst is dissolved in an inert solvent; a slurry of the pre-polymerized catalyst can be thus prepared.

The subsequent step is contacting the pre-polymerized catalyst with an organoaluminum compound as the component (B). To a polymerization reaction vessel used for the main polymerization of an alpha-olefin (for example, an autoclave), a vessel for the pre-contact of the pre-polymerized catalyst and an organoaluminum (a "pre-contact vessel") is attached. To the attached pre-contact vessel, an organoaluminum compound (for example, triethylaluminum, triisobutylaluminum) is added. The pre-polymerized catalyst slurry obtained as mentioned above is added thereto, and these substances are pre-contacted for at most 20 minutes, preferably at most 10 minutes, more preferably at most 1 minute, most preferably at most 0.5 minute.

The subsequent step is the main polymerization of alpha-olefin. To the polymerization reaction vessel, which has been purged with an inert gas (preferably, for example, nitrogen, argon), an alpha-olefin to be polymerized (for example, ethylene, propylene, butene) and an electron donor compound as the component (C) (for example, diisopropyldimethoxysilane, dicyclopentyldimethoxysilane, cyclohexylmethyldimethoxysilane) are added, and heated to room temperature or higher, preferably 30° C. or higher. Then, the pre-contact vessel containing the pre-polymerized catalyst, which has been subjected to the pre-contact mentioned above, is pressurized to inject the catalyst obtained by the pre-contact into the polymerization reaction vessel. The polymerization reaction vessel is heated (generally to a temperature of between normal temperature and 150° C., preferably between 40° C. and 100° C., which changes depending on the type of the alpha-olefin) to polymerize the alpha-olefin. Unreacted alpha-olefin is purged from the polymerization reaction vessel to obtain an alpha-olefin polymer of interest. To produce an alpha-olefin polymer having a desired molecular weight, hydrogen or the like may be added to the polymerization reaction vessel as appropriate.

In accordance with the aforementioned polymerization methods of the present invention, highly stereoregular alpha-olefin polymers can be produced in high polymerization yield. Since the proportion of fine powder present in the obtained alpha-olefin polymers is small, the polymers are particularly superior in processing properties.

EXAMPLES

The present invention will be described in more detail below with reference to Examples. In the Examples, each analysis was performed in the following manner

[MFR]
MFR was measured under the conditions of a temperature of 230° C. and a load of 21.18 N in accordance with JIS K 7210.

[XI (Amount of Xylene-Insoluble Fraction)]
To a 300 mL flask, 2.5 g of a polymer sample and 250 mL of ortho-xylene were added, and the sample was dissolved at a boiling temperature for 30 minutes upon stirring. Subsequently, the resulting solution was allowed to cool to 100° C. and then the flask was put in a constant temperature water tank kept at 25° C. One hour after the solution was cooled to 25° C., it was filtered, ortho-xylene was evaporated from the filtrate collected, and a value obtained by dividing the weight of remaining residues by the weight of the polymer sample charged was multiplied by 100 to determine XI.

[Polymerization Activity]
AA660, a product of Shimadzu Corp., was used to measure the magnesium content of the resulting polymer sample by atomic absorption spectrometry, and the magnesium content of the original catalyst was used to determine the polymerization activity as a polymerization amount per gram of the catalyst.

[Measurement of Amount of Fine Powder]
The polymer obtained by polymerization was sieved with a Ro-Tap sieve shaker and the amount of fine powder that passed through a 125 μm-opening metal mesh was determined based on weight.

Example 1

(1) Preparation of Solid Catalyst Component

A solid catalyst component was prepared in accordance with the preparation method described in the "Examples" section of JP H09-25316 A. More specifically, the preparation was as follows:

56.8 g of anhydrous magnesium chloride was completely dissolved in 100 g of anhydrous ethanol, 500 ml of Vaseline oil CP15N from Idemitsu Kosan Co., Ltd. and 500 ml of silicone oil KF 96 from Shin-Etsu Chemical Co., Ltd. under a nitrogen atmosphere at 120° C. This mixture was stirred with TK Homomixer from Tokushu Kika Kogyo Co., Ltd. at 3000 rpm at 120° C. for 3 minutes. While the mixture was kept being stirred, it was transferred into 2 L of anhydrous heptane at not more than 0° C. The resulting white solid was well washed with anhydrous heptane and vacuum dried at room temperature. 30 g of the resulting spherical solid of $MgCl_2 \cdot 2.5 C_2H_5OH$ was suspended in 200 ml of anhydrous heptane. Upon stirring at 0° C., 500 ml of titanium tetrachloride was added dropwise to the suspension over 1 hour. Next, heating was started, and when the temperature reached 40° C., 4.96 g of diisobutyl phthalate was added and the mixture was heated to 100° C. over about 1 hour. After 2-hour reaction at 100° C., a solid fraction was collected by hot filtration. To this reactant, 500 ml of titanium tetrachloride was then added, and the mixture was stirred, followed by reaction at 120° C. for 1 hour. After the reaction was completed, a solid fraction was collected by hot filtration again and washed seven times with 1 L of hexane at 60° C. and three times with 1 L of hexane at room temperature. To 1 L of a hexane solution containing 19 g of titanium tetrachloride prepared ($TiCl_4[C_6H_4(COOiC_4H_9)_2]$), 27.8 g of diisobutyl phthalate ($C_6H_4(COOiC_4H_9)_2$) was added dropwise for about 30 minutes with the temperature kept at 0° C. After the completion of the dropwise addition, the mixture was heated to 40° C. and reaction was performed for 30 minutes. After the reaction was completed, a solid fraction was collected and washed five times with 500 ml of hexane to produce a solid catalyst component of interest. The solid catalyst component was analyzed, showing that its titanium and magnesium contents were 2.3 wt % and 17.7 wt %, respectively.

(2) Preparation of Pre-Polymerized Catalyst

To a 300 mL three-necked flask purged with nitrogen, 100 mL of purified hexane was added while a small amount of nitrogen was being fed to the flask, and the temperature in the flask was lowered by cooling to 10° C. or less. Subsequently, a hexane solution of triethylaluminum as an organoaluminum compound was added to the flask such that 2.3 mmol of triethylaluminum was added. Further, 500 mg of the solid catalyst component prepared by the method described above was added to the flask. Then, 5 g of propylene gas was supplied to the flask upon stirring at 10° C. and the content was allowed to stand still for 90 minutes to react the propylene completely. Subsequently, only the liquid phase fraction contained in the flask was removed with a syringe while a small amount of nitrogen was being fed. Further, to the remaining pre-polymerized catalyst as a solid phase, 50 mL of purified hexane was added, and only the liquid phase was removed to thereby wash the catalyst. This washing procedure was performed twice. To the washed pre-polymerized catalyst, a small amount of purified hexane was added again to make a slurry of the catalyst (3 g/L), and this slurry was stored at 20° C.

(3) Polymerization of Propylene

An additional vessel was attached to a 3 L-volume autoclave purged with nitrogen, while a small amount of nitrogen was being fed. After the autoclave was purged with propylene gas, 2400 mL of hydrogen and 18.5 mol of propylene were added thereto at 25° C. and the mixture was stirred and heated to 30° C. To the additional vessel to which the small amount of nitrogen had been fed, 4.9 mmol of triethylaluminum and 1.0 mmol of diisopropyldimethoxysilane as an electron donor compound were added. To the additional vessel, 2.5 ml of the pre-polymerized catalyst slurry that had been prepared as mentioned above (containing 7.5 mg of the pre-polymerized catalyst) was added, followed by pre-contact for 0.25 minute. Subsequently, the additional vessel was pressurized with nitrogen to 4 MPa and the catalyst obtained by the pre-contact was injected into the autoclave. The autoclave was heated to 70° C. and propylene was polymerized for 60 minutes. After the completion of the polymerization, unreacted propylene was purged from the autoclave to obtain polypropylene. The obtained polypropylene was vacuum dried at 60° C. for 16 hours and MFR, XI and polymerization activity were analyzed in accordance with the method mentioned above.

Examples 2-5

The same procedures as in Example 1 were performed except that the pre-contact durations were 0.5, 3, 10 and 20 minutes, respectively.

Example 6

A pre-polymerized catalyst was prepared in the same manner as in the steps (1) and (2) of Example 1. Next, while a small amount of nitrogen was being fed to a 3 L-volume autoclave purged with nitrogen, 1.0 mmol of diisopropyldimethoxysilane was added to the autoclave and an additional vessel was attached thereto. After the autoclave was purged with propylene gas, 2400 mL of hydrogen and 18.5 mol of propylene were added thereto at 25° C. and the mixture was stirred and heated to 30° C. To the additional vessel to which the small amount of nitrogen had been fed, 4.9 mmol of triethylaluminum was added. To the additional vessel, 2.5 ml of the pre-polymerized catalyst slurry that had been prepared as mentioned above (containing 7.5 mg of the pre-polymerized catalyst) was added, followed by pre-contact for 0.5 minute. Subsequently, the additional vessel was pressurized with nitrogen to 4 MPa and the catalyst obtained by the pre-contact was injected into the autoclave. The autoclave was heated to 70° C. and propylene was polymerized for 60 minutes. After the completion of the polymerization, unreacted propylene was purged from the autoclave to obtain polypropylene. The obtained polypropylene was vacuum dried at 60° C. for 16 hours and MFR, XI and polymerization activity were analyzed in accordance with the method mentioned above.

Comparative Example 1

A pre-polymerized catalyst was prepared in the same manner as in the steps (1) and (2) of Example 1. While a small amount of nitrogen was being fed to a 3 L-volume autoclave purged with nitrogen, 4.9 mmol of triethylaluminum was added to the autoclave and an additional vessel was attached thereto. After the autoclave was purged with propylene gas, 2400 mL of hydrogen and 18.5 mol of propylene were added thereto at 25° C. and the mixture was stirred and heated to 30° C. To the additional vessel to which the small amount of nitrogen had been fed, 1.0 mmol of diisopropyldimethoxysilane was added and subsequently 2.5 ml of the pre-polymerized catalyst slurry that had been prepared as mentioned above (containing 7.5 mg of the pre-polymerized catalyst) was added thereto, followed by pre-contact for 0.5 minute. The additional vessel was pressurized with nitrogen to 4 MPa and the catalyst obtained by the pre-contact was injected into the autoclave. The autoclave was heated to 70° C. and propylene was polymerized for 60 minutes. After the completion of the polymerization, unreacted propylene was purged from the autoclave to obtain polypropylene. The obtained polypropylene was vacuum dried at 60° C. for 16 hours and MFR, XI and polymerization activity were analyzed in accordance with the method mentioned above.

Examples 7-9

The same procedures as in Example 1 were performed except that the pre-contact durations were 0.25, 0.5 and 3 minutes, respectively, and that the polymerization duration was 180 minutes.

Comparative Example 2

The same procedures as in Comparative Example 1 were performed except that the polymerization duration was 180 minutes.

The results of the respective Examples and Comparative Examples are summarized in Table 1 below.

TABLE 1

Polymerization of propylene

| | Pre-contact method | Pre-contact duration [min] | Polymerization duration [min] | Activity [g-PP/g-catalyst] | XI [wt %] | MFR [g/10 min] | Amount of fine powder [wt %] | Activity increase rate [%] |
|---|---|---|---|---|---|---|---|---|
| Ex. | | | | | | | | |
| 1 | (1) | 0.25 | 60 | 31,100 | 98.3 | 8.6 | 0.009 | 34.6 |
| 2 | (1) | 0.5 | 60 | 31,300 | 98.4 | 9.0 | | 35.5 |
| 3 | (1) | 3.0 | 60 | 28,200 | 98.3 | 8.4 | | 22.1 |
| 4 | (1) | 10 | 60 | 27,700 | 98.3 | 7.1 | | 19.9 |
| 5 | (1) | 20 | 60 | 27,700 | 98.4 | 7.1 | | 19.9 |
| 6 | (2) | 0.5 | 60 | 30,900 | 98.2 | 8.3 | | 33.8 |
| Comp. Ex. | | | | | | | | |
| 1 | (3) | 0.5 | 60 | 23,100 | 98.4 | 7.5 | 0.024 | Reference |
| Ex. | | | | | | | | |
| 7 | (1) | 0.25 | 180 | 59,000 | 98.3 | 14.5 | 0.005 | 38.2 |
| 8 | (1) | 0.5 | 180 | 59,500 | 98.4 | 15.9 | | 39.3 |
| 9 | (1) | 3.0 | 180 | 53,300 | 98.5 | 16.2 | | 24.8 |
| Comp. Ex. | | | | | | | | |
| 2 | (3) | 0.5 | 180 | 42,700 | 98.3 | 16.5 | 0.021 | Reference |

It is revealed that catalytic activity significantly increases in accordance with the method of the first or second embodiment of the present invention. Especially, comparison of the results of Example 2 (the first embodiment) and Example 6 (the second embodiment), which had the same pre-contact duration (0.5 minute), with the result of Comparative Example 1 as a reference showed that the activity increase rates were 35.5% and 33.8%, respectively.

Example 8, which employed a method according to the first embodiment in which the pre-contact duration was 0.5 minute and the polymerization duration was 180 minutes, exhibited an activity increase rate of 39.3% relative to that of Comparative Example 2 as a reference. As demonstrated above, high catalytic activity can be maintained by a method according to the present invention, even when the polymerization duration is long.

In alpha-olefin polymers produced by the method of the present invention, the proportion of fine powder present is small. Example 1 and Comparative Example 1 cannot be directly compared since they differ in pre-contact duration, but it is revealed that the proportion of fine powder present is smaller in the alpha-olefin polymer produced in Example 1. Likewise, comparison between Example 7 and Comparative Example 2 reveals that the proportion of fine powder present is smaller in the alpha-olefin polymer produced in Example 7. More specifically, alpha-olefin polymers can be produced stably by the method of the present invention, because any trouble such as production line blockage due to fine powder aggregation can be reduced. In addition, it is appreciated that the obtained alpha-olefin polymers are particularly superior in processing properties.

The invention claimed is:

1. A method for producing a propylene polymer using a catalyst comprising the following components:
   (A) a solid catalyst component comprising, as essential components, magnesium, titanium, a halogen and an electron donor compound;
   (B) a trialkyl aluminum compound; and
   (C) an organosilicon compound as an electron donor compound, the method comprising the following steps:
   (1) pre-polymerizing propylene in the presence of the components (A) and (B) and in the absence of component (C) to form a pre-polymerized catalyst;
   (2) bringing the pre-polymerized catalyst formed in the absence of component (C) in step (1) into contact with a contact product produced by pre-contact of the components (B) and (C), the contact having a duration that is 3 minutes or less; and
   (3) adding the pre-polymerized catalyst that has been contacted with the contact product in step (2) to a polymerization reaction vessel charged with propylene to polymerize the propylene.

2. The method according to claim 1, wherein the component (C) is diisopropyldimethoxysilane.

3. The method according to claim 1, wherein the titanium compound of the component (A) is a tetravalent titanium compound represented by the formula:

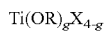

wherein R is a hydrocarbon group, X is a halogen, and g is $0 \leq g \leq 4$.

4. The method according to claim 1, wherein the magnesium compound of the component (A) is a magnesium compound having a magnesium-carbon bond or a magnesium-hydrogen bond, a magnesium halide, alkoxymagnesium halide, aryloxymagnesium halide, alkoxy magnesium, aryloxy magnesium, or a carboxylic acid salt of magnesium.

5. The method according to claim 1, wherein the electron donor compound of the component (A) is represented by the formulas:

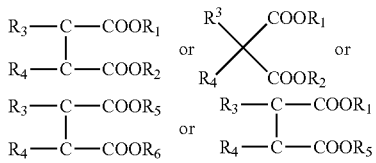

wherein $R_1$ is a substituted or unsubstituted hydrocarbon group, each of $R_2$, $R_5$, and $R_6$ is hydrogen or a substituted or unsubstituted hydrocarbon group, at least one of $R_3$ or $R_4$ is hydrogen or a substituted or unsubstituted hydrocarbon group, wherein $R_3$ and $R_4$ may be linked or unlinked, and wherein any substituted groups $R_1$-$R_6$ have a group including a heteroatom N, O, or S.

6. The method according to claim 5, wherein the electron donor compound of the component (A) is a polycarboxylic acid diester in which at least one of $R_1$ and $R_2$ is an alkyl group having at least two carbon atoms.

7. The method according to claim 1, wherein the halogen of the component (A) is chlorine.

* * * * *